United States Patent [19]

Riera

[11] Patent Number: 5,083,525
[45] Date of Patent: Jan. 28, 1992

[54] FELT DISPENSER FOR AUTOMOBILE GLASS INSTALLATION PREPARATION

[76] Inventor: Frank J. Riera, 576 Colebrook, Troy, Mich. 48083

[21] Appl. No.: 421,787

[22] Filed: Oct. 16, 1989

[51] Int. Cl.$^5$ .......................... B05C 1/02; B05C 11/02
[52] U.S. Cl. ...................................... 118/106; 118/109;
    118/257; 118/264; 118/268; 222/187; 242/68.4;
    242/75.4; 242/118.61; 242/128; 242/129.51
[58] Field of Search ............... 118/257, 264, 268, 266,
    118/267, 100, 106, 109; 242/129.51, 118.61,
    68.4, 55.2, 75.4, 128, 118.4, 150 R, 73;
    15/104.92, 104.93; 222/187

[56] References Cited

U.S. PATENT DOCUMENTS

| | | | |
|---|---|---|---|
| 1,955,067 | 4/1934 | Hope et al. | 242/55.2 |
| 2,083,096 | 6/1937 | Rutkowski | 242/118.61 |
| 2,394,585 | 2/1946 | Bailey | 118/257 |
| 3,521,833 | 7/1970 | Ridgeway et al. | 242/118.61 |
| 3,647,158 | 3/1972 | Feder | 242/68.4 |
| 3,799,471 | 3/1974 | Morris et al. | 242/129.51 |
| 4,668,326 | 5/1987 | Mistyurik | 242/68.4 |
| 4,739,945 | 4/1988 | Yokoe | 242/118.61 |

*Primary Examiner*—Michael Wityshyn
*Attorney, Agent, or Firm*—Harness, Dickey & Pierce

[57] ABSTRACT

An improved dispensing apparatus is disclosed which is specifically adapted to provide a supply of wiping material for use in conjunction with the application of coatings to motor vehicle window glass. The dispensing apparatus of the present invention incorporates a spool carrying a substantial supply of the required wiping material and associated support apparatus for supporting the spool in close proximity to its area of use. The support apparatus enables quick and easy replacement of the spools as well as providing a controlled resistance to rotational movement of the spool during operation of the apparatus.

11 Claims, 1 Drawing Sheet

FELT DISPENSER FOR AUTOMOBILE GLASS INSTALLATION PREPARATION

BACKGROUND AND SUMMARY OF THE INVENTION

The present invention relates generally to dispensing apparatus for use in connection with apparatus for applying coatings to motor vehicle window glass and more specifically to a spool arrangement for dispensing a continuous length of wiping means and associate support means for mounting the spool on the apparatus.

Window glass installed in present day motor vehicles typically incorporates a blacked out band extending around the peripheral edge portion thereof. In order to form this blacked out band, it is necessary to apply an initial primer coating to the window glass after which the finish coat is applied. Thereafter an adhesive may be applied if required and the glass installed in the motor vehicle.

Typically these coatings are applied to the window glass in an automated process wherein a quantity or bead of the desired coating is fed onto the surface of the glass in a liquid or semi-liquid form. Thereafter the coating is spread evenly over the desired area and allowed to dry. Alternatively, in other operations a supply of the coating material is fed to and applied by the wiping means itself.

In order to accomplish this operation, an articulated robotic arm is provided which carries an elongated strip of felt. The end of the felt strip is moved along the edge of the glass by the robotic arm and operates to evenly spread the coating material over the area of the glass to be covered. It is necessary that a new end of felt be presented for each successive piece of glass and hence the arm also carries feeder means which operate to periodically advance a new section of the felt at which time the previously used end portion is severed from the supply length. Heretofore these elongated lengths of felt have been carried in an elongated serpentine tube mounted on the arm. However, because the tube can only accommodate a single length of felt, typically about eight feet long, it has been necessary to shut down the operation to replenish the felt supply two or three times each working day. This repetitive shut down not only impedes the production process but also incurs additional expense in the form of man-hours to periodically check the supply remaining as well as to replenish same. While the use of longer supply tubes would result in reducing the frequency of replenishment, this has not been possible because the feed means will tend to slip and/or shred the felt due to the increased frictional resistance created by the sliding movement through the feed tube of longer lengths of such felt.

The present invention, however, overcomes these problems by providing a spool capable of carrying substantially longer lengths of felt typically on the order of 30-35 feet or even longer. Mounting means are also provided on the robotic arm in close proximity to the feed means to rotationally support the spool thereon. Preferably, the mounting means is designed to enable quick and easy replacement of the spool and also to provide a predetermined resistance to the rotational movement thereof whereby premature unwinding of the felt strip can be avoided. Further, because the spool is fabricated from materials which can be burned, disposal of used spools is easily accomplished.

The increased length of felt available substantially increases productivity as replenishment of the supply is now required only once every one or two days. Further, because the supply is contained on a spool which may be easily and quickly installed, the time required to accomplish this replenishment task is greatly reduced. Further, because the spool is readily visible even when the machine is in operation, visual inspections may be accomplished to insure an adequate supply remains without the need to shut down machine operation.

Additional advantages and features of the present invention will become apparent from the subsequent description and the appended claims taken in conjunction with the accompanying drawings.

DESCRIPTION OF THE PREFERRED EMBODIMENT

Figure 1:
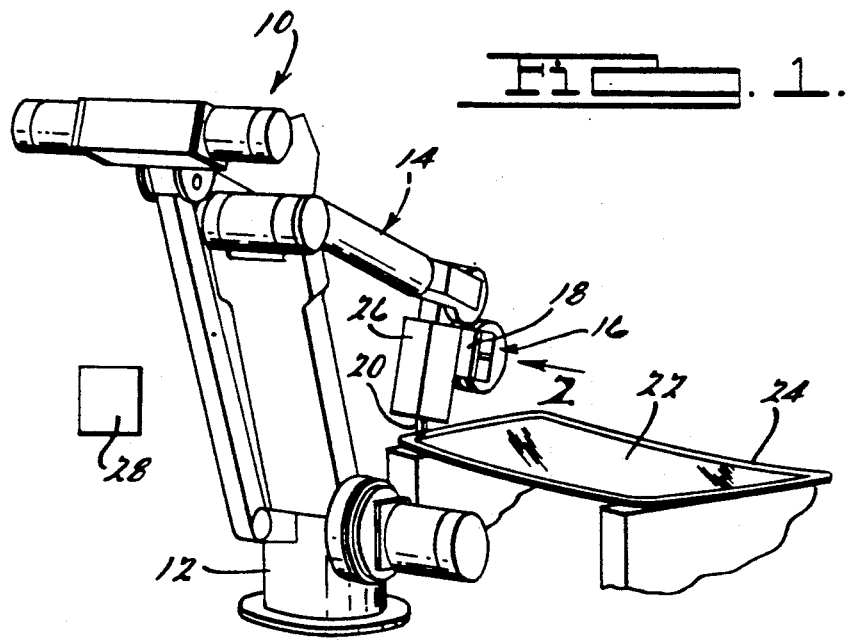
FIG. 1 is a perspective view of a robotic arm assembly shown in operative relationship to a motor vehicle window glass and incorporating the improved dispensing apparatus of the present invention.

Referring now to the drawings and in particular to FIG. 1, there is shown a robotic arm assembly 10 rotatably supported upon a base 12 and having an articulated arm 14 upon which is mounted a spool 16 and associated mounting means 18 therefor. As shown, arm 14 is designed to move the terminal end portion 20 of a supply wiping means around the peripheral edge of a sheet of motor vehicle window glass 22 to apply and/or spread a coating 24 thereon. Arm 14 also has supported on the outer end thereof feed means 26 which operate to periodically advance successive increments of the wiping means. Positioned adjacent arm assembly 10 are trimming means 28 which operate to trim the used end portion 20 of the wiping means as new increments are advanced.

Figure 2:
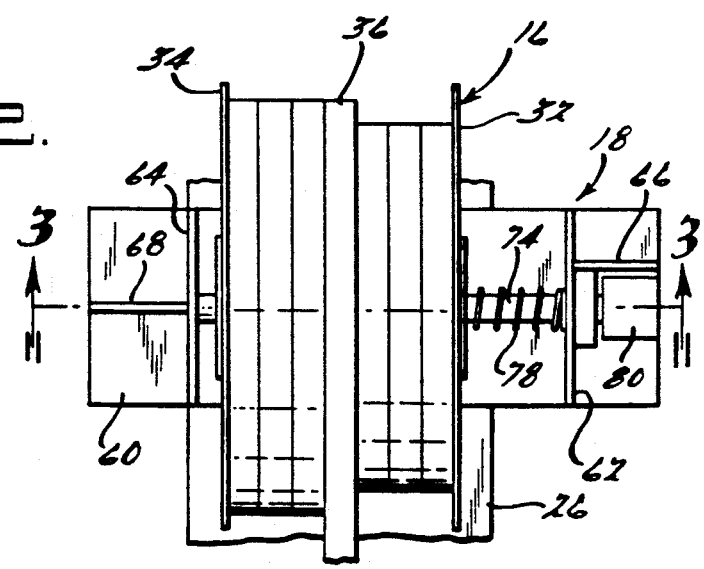
FIG. 2 is an elevational view of the spool and associated support assembly shown in FIG. 1, all in accordance with the present invention.
Figure 3:
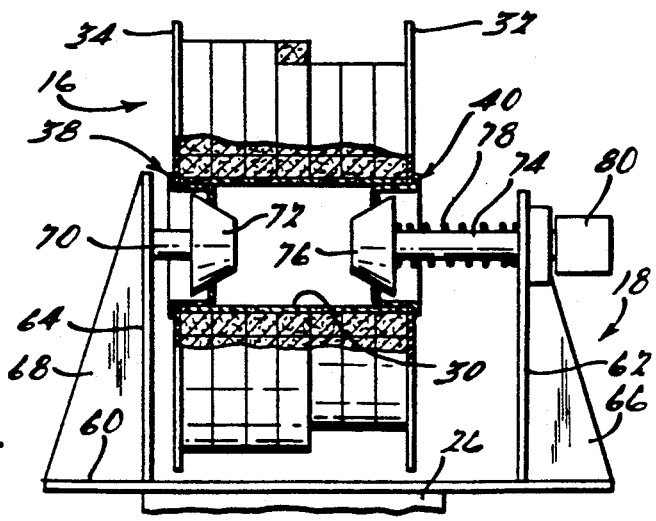
FIG. 3 is a section view of the spool and associated support assembly of FIG. 2, the section being taken along lines 3—3 thereof.

As best seen with reference to FIGS. 2 and 3, spool 16 includes an elongated hollow center cylindrical member 30 with radially outwardly extending circular end flanges 32, 34 abutting opposite ends thereof. Flanges 32, 34 are substantially identical an include center openings positioned coaxial with and of substantially identical diameter as the inside diameter of cylindrical member 30. Preferably cylindrical member 30 and end flanges 32, 34 will be fabricated from an easily disposable material such as cardboard for example. An elongated supply of wiping material 36 which, as previously mentioned, is typically a felt material is wound upon cylindrical member 30 and contained between opposing flanges 32, 34.

Figure 4:
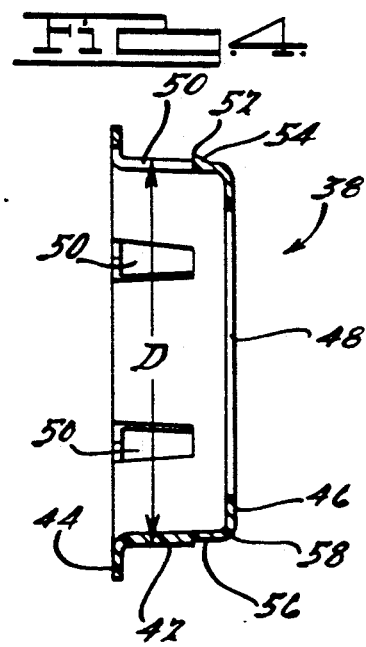
FIG. 4 is a radial section view of the bushing forming a part of spool assembly of FIG. 4.

In order to retain flanges 32, 34 in assembled relationship with cylindrical member 30, a pair of substantially identical bushing members 38, 40 are provided, one being fitted within each end of cylindrical member 30. As best seen with reference to FIG. 4, bushing member 38 has an elongated cylindrically shaped main body portion 42 provided with a radially outwardly extending flange portion 44 at one end thereof and a radially inwardly extending flange portion 46 at the opposite end thereof which defines a central opening 48. A plurality of substantially identical circumferentially spaced openings 50 are provided around the periphery of main body portion 42 and extend radially outwardly somewhat into flange portion 44. A radially outwardly extending relatively rigid tooth portion 52 is provided on main body portion 42 at the axially inner end of each of the openings and includes an axially and radially inwardly extending wall portion 54. Preferably the outside diameter "D" of main body portion will be equal to the inside diameter of cylindrical member 30 so as to provide a snug fit therebetween. As teeth 52 project radially outwardly from the main body portion 42, they will operate to bite into the inside diameter of cylindrical member 30 so as to retain bushing 38 in assembled relationship therewith. The beveled radially and axially inwardly extending wall portion 54 of teeth 52 will serve to facilitate movement of bushing members 38 and 40 into cylindrical member 30 during assembly thereof. In order to aid in aligning of bushing member 38 with cylindrical member 30 so as to further facilitate assembly thereof, main body portion 42 has a reduced outside diameter portion 56 adjacent the axially inner end thereof as well as a rounded shoulder portion 58 at the juncture with flange portion 46.

In assembling spool 16, end flanges 32 and 34 are first positioned in abutting relationship with cylindrical member 30 after which respective bushing members 38 and 40 are aligned with the openings and pushed axially inwardly. Flange portion 44 will move into abutting overlying relationship to respective flanges 32 and 34 and serve to clamp them against the opposite end portions of cylindrical member 30. Thereafter, the elongated length of wiping means 36 may be wound upon cylindrical member 30. Typically, spool 16 is designed to accommodate 35 to 40 feet of such felt although greater lengths may be wound thereof if desired which would further reduce the frequency of required spool replacement.

Support means 18 is designed to be fixedly secured to arm 14 adjacent feed means 26 so as to rotatably support spool 16 thereon. Support means 18 includes a base plate 60 to which a pair of flange members 62, 64 are secured which project outwardly therefrom in generally parallel spaced relationship. Reinforcing gussets 66, 68 may also be provided to further support and rigidify flanges 62, 64.

A shaft 70 is secured to flange 64 adjacent the outer end thereof and projecting outwardly toward flange 62. A frusto conical member 72 is supported on the outer end of shaft 70 and is adapted to extend partially through opening 48 in bushing 38 and to engage the walls defining same so as to support spool 16 thereon. A second shaft 74 is axially movably supported on flange 62 adjacent the outer end thereof and in coaxial relationship with shaft 72. Shaft 74 also includes a frusto conical member 76 secured to the outer end thereof which is adapted to be received with opening 48 of bushing 42 so as to cooperate with member 72 to thereby support spool 16 therebetween. A helical coil spring 78 extends between flange 62 and frusto conical member 76 and serves to axially bias shaft 74 toward flange 64 whereby frusto conical member 76 is resiliently urged into engagement with bushing 40. Preferably both shafts 70 and 74 and frusto conical members 72 and 76 will be non-rotatably supported on respective flanges 64 and 62. Thus the biasing action of spring 78 will exert a frictional drag on spool 16 via the sliding engagement of frusto conical members 72 and 76 with the walls defining openings 48 in respective bushings 38 and 40. By proper selection of the spring pressure, this frictional drag may be controlled so as to enable feed means to resist premature uncoiling of the wiping means 36 from spool 16 while still enabling the feed means to advance successive increments of equal length of wiping means without damage or excessive stretching of same.

In order to replace spool 16 once the supply of wiping means has been exhausted, the operator need merely pull axially outwardly on handle 80 secured to an outwardly projecting end portion of shaft 74 thereby compressing spring 78 and drawing frusto conical member 76 out of engagement with bushing 40. Spool 16 may then be easily removed from support means 18 and a new spool 16 positioned therein. Releasing handle 80 will allow spring 78 to move frusto conical member 76 into supporting engagement with bushing 40 of the new spool member. Thereafter, the end of the wiping means may be fed into the advancing means 26 and the apparatus placed back in production. The old spool 16 may now be easily discarded. It should be noted that because cylindrical member 30 and flanges 32 and 34 are preferably fabricated from a cardboard material and bushing members 38 and 40 are preferably fabricated from a suitable polymeric composition which will not release toxic or otherwise prohibited gases, spools 16 may be easily disposed of by burning if desired. Alternatively, of course, spool 16 may be fabricated from recyclable materials or in a manner to render it reusable.

As may now be appreciated, the present invention provides a greatly improved means by which a supply of wiping means may be provided to apparatus for applying coatings to motor vehicle window glass. The spool and associated mounting means not only offer substantial cost savings by significantly reducing the frequency required for replenishment of the wiping means but also greatly speed up this task when required as no longer must the length of felt be hand fed into the elongated tube utilized heretofore. Further, because the spool is readily visible during operation of the machine, the remaining supply can be checked without shutting down the machine. Additionally, because the dispensing apparatus of the present invention is more compact than the elongated serpentine tube previously used, less concern is required as to the clear area required to be maintained around the operating robotic arm assembly.

While it will be apparent that the preferred embodiment of the invention disclosed is well calculated to provide the advantages and feature above stated, it will be appreciated that the invention is susceptible to modification, variation and change without departing from the proper scope or fair meaning of the subjoined claims.

I claim:

1. In an apparatus for applying coatings to the peripheral edge portion of motor vehicle window glass in preparation for installation thereof in a motor vehicle, said apparatus including an articulated arm, wiping means carried by said arm for wiping said coating along said peripheral edge portion, advancing means for advancing said wiping means and severing means for severing used portions of said wiping means, an improved dispensing means for providing a continuous supply of wiping means to said feed means comprising cylindrical spool means, an elongated supply of wiping means spirally wound on said spool means and non-rotatable support means mounted on said arm means for rotatably supporting said spool means on said arm means adjacent said feed means to enable visual inspection of the supply of wiping means during operation of said apparatus, said spool means including a central elongated cylindrical portion having a bore extending therethrough and spaced radially outwardly extending flange portions engaging opposite ends of said elongated cylindrical portion, said bore opening outwardly through said flange portions, a pair of inserts fitted in opposite ends of said bore, each of said inserts includes a first radially outwardly extending flange portion overlying an outer surface of said flange portion, a second radially inwardly extending flange portion disposed internally of said bore and a cylindrically shaped portion extending between and interconnecting said first and second flange portions, said non-rotatable support means including first and second opposed conically shaped members engageable with said radially inwardly extending flange portion and biasing means operative to create a continuous predetermined frictional engagement between said radially inwardly extending flange portions and said conically shaped members to thereby control unwinding of said wiping means from said spool.

2. An apparatus as set forth in claim 1 wherein said inserts are operable to retain said flange portions of said spool means in engaging relationship with said central cylindrical portion.

3. An apparatus as set forth in claim 2 wherein said inserts include retention means cooperating with said central cylindrical portion to retain said inserts and said flange portions of said spool means in assembled relationship with said central elongated cylindrical portion.

4. An apparatus as set forth in claim 1 wherein one of said conically shaped members is axially movable for releasably supporting said spool means.

5. An apparatus as set forth in claim 1 wherein said support means comprises a pair of shafts non-rotatably supported in spaced coaxial relationship, one of said first and second conically shaped members being supported on the facing ends of each of said shafts, said first and second conically shaped members being operative to rotatably support said spool means therebetween.

6. An apparatus as set forth in claim 5 wherein one of said shafts is axially movable to thereby facilitate replacement of said spool means.

7. An apparatus as set forth in claim 6 wherein said biasing means includes a helical coil spring coaxial with said one of said shafts.

8. In an apparatus for applying coatings to the peripheral edge portion of motor vehicle window glass in preparation for installation thereof in a motor vehicle, said apparatus including an articulated arm, wiping means carried by said arm for wiping said coating along said peripheral edge portion, advancing means for advancing said wiping means and severing means for severing used portions of said wiping means, an improved dispensing means for providing a continuous supply of wiping means to said advancing means comprising a spool having an elongated hollow cylindrical center member and radially extending flange members abutting opposite ends of said center member, an elongated length of wiping means spirally wound on said center member and mounting means for rotatably supporting said spool adjacent said advancing means on said arm, said mounting means including a non-rotatable first means having a conically shaped surface engageable with one end of said spool and non-rotatable second means having a conically shaped surface engageable with the other end of said spool, said second means being positioned coaxial with said first means and being axially movable with respect to said first means to facilitate replacement of said spool and biasing means operative to axially bias said second means into engagement with said spool means and to bias the other end of said spool means against said first means to rotatably support said spool, said biasing means being operative to create a continuous predetermined frictional engagement between said spool and said conically shaped surfaces of said first and second means to thereby control unwinding of said wiping means from said spool.

9. An apparatus as set forth in claim 8 further comprising bushing means secured within said hollow center member, said conically shaped surfaces being provided on conical end portions of said first and second means and engageable with said bushings for supporting said spool.

10. An apparatus as set forth in claim 9 wherein said bushings operate to retain said radially extending flange portions in assembled relationship to said center member.

11. An apparatus as set forth in claim 8 wherein said spool is fabricated from combustible materials to facilitate disposal thereof.

* * * * *